US011083354B2

(12) United States Patent
Bloom et al.

(10) Patent No.: US 11,083,354 B2
(45) Date of Patent: Aug. 10, 2021

(54) DIRT COLLECTOR FOR A VACUUM CLEANER

(71) Applicant: TTI (Macao Commercial Offshore) Limited, Macau (CN)

(72) Inventors: Michael Bloom, Charlotte, NC (US); Steven Marcus, Charlotte, NC (US); William Jacob Kozlowski, Jr., Waxhaw, NC (US)

(73) Assignee: Techtronic Floor Care Technology Limited, Tortola (VG)

( * ) Notice: Subject to any disclaimer, the term of this patent is extended or adjusted under 35 U.S.C. 154(b) by 228 days.

(21) Appl. No.: 16/142,201

(22) Filed: Sep. 26, 2018

(65) Prior Publication Data

US 2019/0125152 A1 May 2, 2019

Related U.S. Application Data

(60) Provisional application No. 62/572,225, filed on Oct. 13, 2017, provisional application No. 62/572,229, (Continued)

(51) Int. Cl.
*B01D 49/00* (2006.01)
*A47L 9/19* (2006.01)
(Continued)

(52) U.S. Cl.
CPC .................. *A47L 9/19* (2013.01); *A47L 9/12* (2013.01); *A47L 9/1683* (2013.01);
(Continued)

(58) Field of Classification Search
CPC ........ A47L 9/19; A47L 9/2805; A47L 9/2821; A47L 9/1683; A47L 9/12; A47L 9/30;
(Continued)

(56) References Cited

U.S. PATENT DOCUMENTS 3,631,654 A * 1/1972 Riely ................. B01D 19/0031
96/6
5,141,309 A * 8/1992 Worwag .................... A47L 9/19
356/72

(Continued)

FOREIGN PATENT DOCUMENTS

CN          101036568 A       9/2007
CN          204056884 U       12/2014
(Continued)

OTHER PUBLICATIONS

Invitation to Pay Additional Fees and Partial Search Report for Application No. PCT/US2018/052811, dated Mar. 7, 2019, 14 pages.

(Continued)

*Primary Examiner* — Dung H Bui
(74) *Attorney, Agent, or Firm* — Michael Best & Friedrich LLP

(57) ABSTRACT

A dirt collector that includes a housing and an air-permeable filter media extending from the housing such that the filter media and housing at least partially define a collection volume. The housing has an inlet opening in fluid communication with the volume and at least a portion of the housing is transmissive of infrared radiation

19 Claims, 9 Drawing Sheets

Related U.S. Application Data filed on Oct. 13, 2017, provisional application No. 62/564,432, filed on Sep. 28, 2017.

(51) Int. Cl.

| | | |
|---|---|---|
| *A47L 9/28* | (2006.01) | |
| *A47L 9/16* | (2006.01) | |
| *A47L 9/12* | (2006.01) | |
| *A47L 9/30* | (2006.01) | |
| *B01D 46/00* | (2006.01) | |
| *G01F 23/292* | (2006.01) | |
| *B01D 46/42* | (2006.01) | |

(52) U.S. Cl.
CPC .......... *A47L 9/2805* (2013.01); *A47L 9/2821* (2013.01); *A47L 9/2857* (2013.01); *A47L 9/2894* (2013.01); *A47L 9/30* (2013.01); *B01D 46/0002* (2013.01); *B01D 46/0086* (2013.01); *B01D 46/4254* (2013.01); *G01F 23/292* (2013.01); *A47L 9/2815* (2013.01); *B01D 2273/18* (2013.01); *B01D 2273/28* (2013.01); *B01D 2279/55* (2013.01)

(58) Field of Classification Search
CPC .... A47L 9/2857; A47L 9/2894; A47L 9/2842; A47L 9/108; A47L 9/1691; G01F 23/292; B01D 46/0005; B01D 46/10; B01D 46/0002; B01D 46/4254; B01D 46/0086; B01D 2279/55; B01D 2273/28; B01D 2273/18; F24F 11/39
See application file for complete search history.

(56) References Cited

U.S. PATENT DOCUMENTS

| | | | | |
|---|---|---|---|---|
| 5,311,023 A * | 5/1994 | Means, Jr. | ......... | B01D 46/0086 250/341.7 |
| 5,563,334 A * | 10/1996 | Bracht | .................. | B01D 46/42 342/350 |
| 6,029,309 A | 2/2000 | Imamura | | |
| 6,058,560 A | 5/2000 | Gab et al. | | |
| 6,237,648 B1 | 5/2001 | Busacca et al. | | |
| 6,447,586 B1 * | 9/2002 | Campbell | ......... | B01D 46/0086 261/DIG. 65 |
| 6,571,422 B1 | 6/2003 | Gordon et al. | | |
| 7,012,685 B1 * | 3/2006 | Wilson | ............... | B01D 46/0086 356/239.1 |
| 7,143,467 B2 | 12/2006 | Seith | | |
| 7,237,298 B2 | 7/2007 | Reindle et al. | | |
| 7,424,766 B2 | 9/2008 | Reindle et al. | | |
| 7,509,707 B2 | 3/2009 | Pullins | | |
| 7,599,758 B2 | 10/2009 | Reindle et al. | | |
| 7,673,368 B2 | 3/2010 | Cloud, III | | |
| 7,770,253 B2 | 5/2010 | Ha et al. | | |
| 7,785,396 B2 | 8/2010 | Hwang et al. | | |
| 7,811,346 B1 * | 10/2010 | Henson | ............. | B01D 46/0005 55/385.1 |
| 7,823,249 B2 | 11/2010 | Zahuranec et al. | | |
| 7,958,598 B2 | 6/2011 | Yun et al. | | |
| 7,987,550 B2 | 8/2011 | Nielsen | | |
| 7,992,253 B2 | 8/2011 | Yun et al. | | |
| 7,998,234 B2 | 8/2011 | Hwang et al. | | |
| 8,012,250 B2 | 9/2011 | Hwang et al. | | |
| 8,021,452 B2 | 9/2011 | Hwang et al. | | |
| 8,043,397 B2 | 10/2011 | Hwang et al. | | |
| 8,043,410 B2 | 10/2011 | Hwang et al. | | |
| 8,060,979 B2 | 11/2011 | Hwang et al. | | |
| 8,099,825 B2 | 1/2012 | Zahuranec et al. | | |
| 8,240,001 B2 | 8/2012 | Hwang et al. | | |
| 8,312,593 B2 | 11/2012 | Hwang et al. | | |
| 8,404,034 B2 | 3/2013 | Hwang et al. | | |
| 8,689,398 B2 | 4/2014 | Chung et al. | | |
| 8,726,457 B2 | 5/2014 | Liu et al. | | |
| 8,726,459 B2 | 5/2014 | Yun et al. | | |
| 8,821,621 B2 * | 9/2014 | Dwyer | ................. | A62B 18/088 96/416 |
| 9,015,897 B2 | 4/2015 | Jonsson et al. | | |
| 9,089,250 B2 | 7/2015 | Stein | | |
| 2002/0154809 A1 * | 10/2002 | Yamagishi | ........... | G01N 21/909 382/142 |
| 2004/0025285 A1 * | 2/2004 | McCormick | ......... | A47L 9/1683 15/352 |
| 2004/0083896 A1 * | 5/2004 | Mihaylov | .......... | B01D 46/0086 96/414 |
| 2005/0183230 A1 | 8/2005 | Uehigashi | | |
| 2006/0075899 A1 * | 4/2006 | Evans | ................ | B01D 46/0047 96/415 |
| 2006/0150360 A1 | 7/2006 | Reick-Mitrisin et al. | | |
| 2007/0084011 A1 | 4/2007 | Cloud, III | | |
| 2007/0214597 A1 | 9/2007 | Suzuki | | |
| 2008/0092742 A1 * | 4/2008 | Marra | .................... | B60H 1/008 96/16 |
| 2008/0295685 A1 * | 12/2008 | Uhland | .............. | B01D 46/2411 95/25 |
| 2010/0017151 A1 * | 1/2010 | Kerrigan | ............ | B01D 46/0086 702/47 |
| 2010/0084347 A1 * | 4/2010 | Wilder | ..................... | C02F 1/003 210/717 |
| 2010/0192772 A1 * | 8/2010 | Poon | .................. | B01D 46/0086 96/26 |
| 2010/0236014 A1 * | 9/2010 | Fester | ...................... | A47L 5/28 15/347 |
| 2010/0293742 A1 | 11/2010 | Chung et al. | | |
| 2011/0271480 A1 * | 11/2011 | Kara | ......................... | A47L 9/19 15/339 |
| 2012/0125592 A1 * | 5/2012 | Fadell | ..................... | F24F 11/30 165/201 |
| 2012/0152280 A1 | 6/2012 | Bosses et al. | | |
| 2012/0169497 A1 * | 7/2012 | Schnittman | ............... | G01V 8/20 340/540 |
| 2012/0234169 A1 * | 9/2012 | Painter | ................. | F01N 3/0237 95/278 |
| 2013/0186279 A1 * | 7/2013 | Dwyer | .................... | A62B 7/10 96/418 |
| 2013/0231606 A1 * | 9/2013 | Stearns | ............. | B01D 46/0008 604/26 |
| 2013/0283563 A1 * | 10/2013 | Fry | .................... | B01D 46/0075 15/347 |
| 2013/0289919 A1 * | 10/2013 | Wilson, Jr. | ............. | G01N 21/59 702/104 |
| 2015/0230680 A1 | 8/2015 | Li et al. | | |
| 2015/0273382 A1 * | 10/2015 | Stoner, Jr. | .......... | B01D 46/0023 96/415 |
| 2016/0121251 A1 * | 5/2016 | Baek | .................. | B01D 46/0086 95/25 |
| 2016/0136557 A1 * | 5/2016 | Ragaller | ................. | B01D 41/04 95/1 |
| 2016/0216154 A1 * | 7/2016 | Hofmeister | ........... | G01J 3/0286 |
| 2017/0000305 A1 | 1/2017 | Gordon et al. | | |
| 2017/0001137 A1 * | 1/2017 | Lans | .................... | B01D 46/008 |
| 2017/0095762 A1 * | 4/2017 | Wolowicz | .......... | B01D 46/0086 |
| 2017/0138832 A1 * | 5/2017 | Maguire-Boyle | ...... | G01N 15/08 |
| 2017/0273526 A1 * | 9/2017 | Love | ......................... | A47L 5/22 |
| 2018/0050926 A1 * | 2/2018 | Ruprecht | ............. | B01D 27/146 |
| 2018/0055315 A1 * | 3/2018 | Conrad | .................. | A47L 9/0072 |
| 2018/0055316 A1 | 3/2018 | Noehr Larsen et al. | | |
| 2018/0055325 A1 * | 3/2018 | Yoon | ....................... | G01S 15/931 |
| 2018/0361295 A1 * | 12/2018 | Legare | .................. | A62B 18/006 |
| 2019/0090036 A1 * | 3/2019 | Scope | ...................... | F01P 11/12 |

FOREIGN PATENT DOCUMENTS

| | | |
|---|---|---|
| CN | 104857780 A | 8/2015 |
| CN | 106115119 A | 11/2016 |
| CN | 206318279 U | 7/2017 |

(56) References Cited

FOREIGN PATENT DOCUMENTS

DE   102005045544 A1   3/2007
DE   102012110758 A1   5/2014

OTHER PUBLICATIONS

International Search Report and Written Opinion for Application No. PCT/US2018/052811, dated Apr. 30, 2019, 19 pages.
Chinese Patent Office Action for Application No. 201880063303.4 dated Dec. 21, 2020 (10 pages including statement of relevance).

* cited by examiner

DIRT COLLECTOR FOR A VACUUM CLEANER

CROSS-REFERENCE TO RELATED APPLICATIONS

This application claims priority to U.S. Provisional Patent Application No. 62/564,432, filed Sep. 28, 2017 and to U.S. Provisional Patent Application No. 62/572,225, filed Oct. 13, 2017 and to U.S. Provisional Patent Application No. 62/572,229, filed Oct. 13, 2017, the entire contents all of which are hereby incorporated by reference herein.

BACKGROUND

The present invention relates to vacuum cleaners.

Vacuum cleaners typically include a suction source and a dirt collector that separates and stores debris from a suction air stream generated by the suction source. It can be difficult for the user to know when the amount of debris in the dirt collector affects performance and therefore it can be difficult for the user to know when to empty or replace the dirt collector.

SUMMARY

In one embodiment a dirt collector includes a housing and an air-permeable filter media extending from the housing such that the filter media and housing at least partially define a collection volume. The housing has an inlet opening in fluid communication with the volume and at least a portion of the housing is transmissive of infrared radiation.

In another embodiment a dirt collector includes a housing and an air-permeable filter media extending from the housing such that the filter media and the housing at least partially define a collection volume. The housing has an inlet opening in fluid communication with the volume at least a portion of the housing is translucent or transparent.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
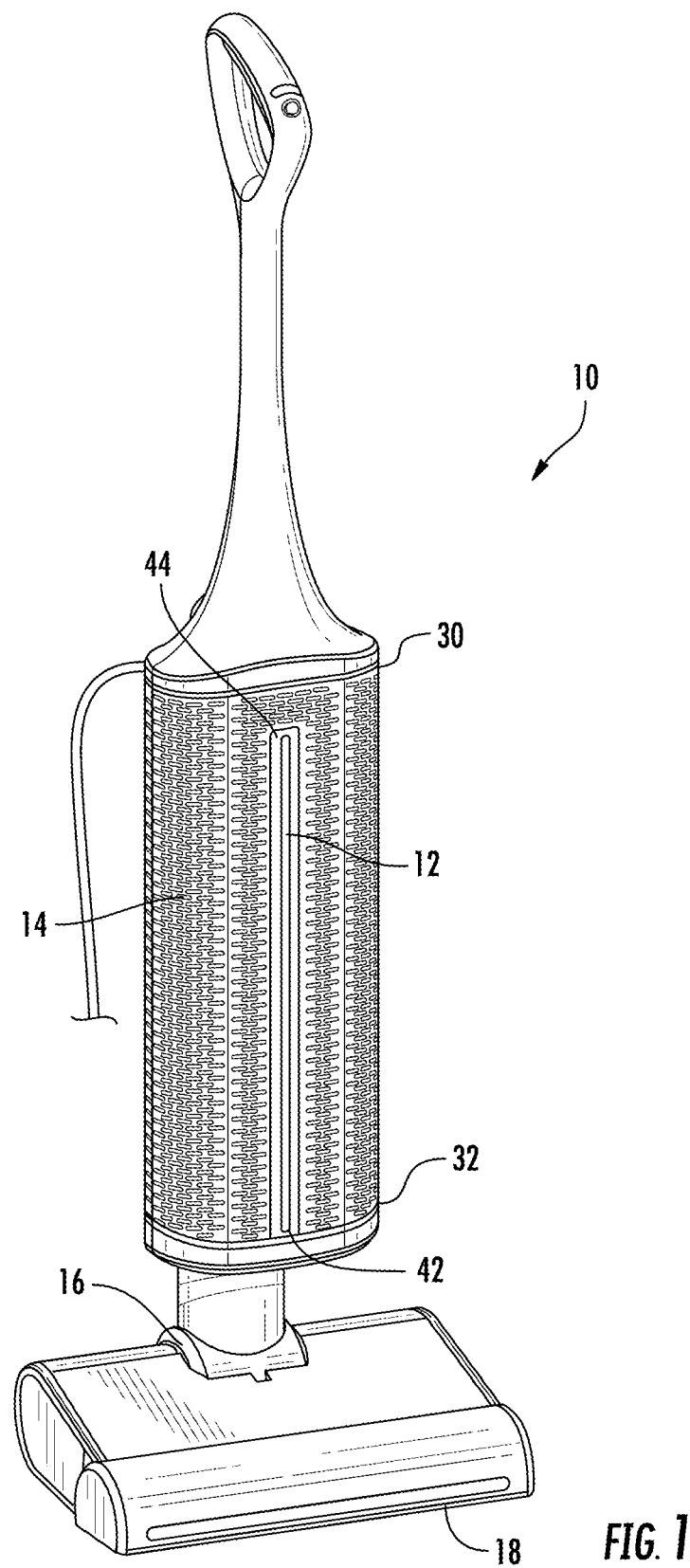
FIG. 1 is a perspective view of a vacuum cleaner according to an embodiment.

FIG. 1 illustrates a vacuum cleaner 10. As will be discussed in more detail below, the vacuum cleaner 10 includes a visual display 12 located on a front side of a dirt collector 14 of the vacuum 10 that indicates to the user a fill level of the dirt collector 14. Therefore, the user can monitor the fill level of the dirt collector 14 during use of the vacuum 10 to determine when to empty or replace the dirt collector 14.

The illustrated vacuum cleaner 10 includes a suction source 16 and a suction nozzle 18. The suction source 16 generates a suction airflow through the nozzle 18 to draw debris from the surface being cleaned through the nozzle 18 with the suction airflow. The suction source 18 includes a fan and a motor. In some embodiments, the motor is a battery powered motor and in other embodiments, the motor is an alternating current motor. Also, in the illustrated embodiment, the suction source 16 is located in the suction airflow path between the nozzle 18 and the dirt collector 14. In other embodiments, the suction source 16 can be positioned downstream or after the dirt collector in the suction airflow path.

Figure 6:
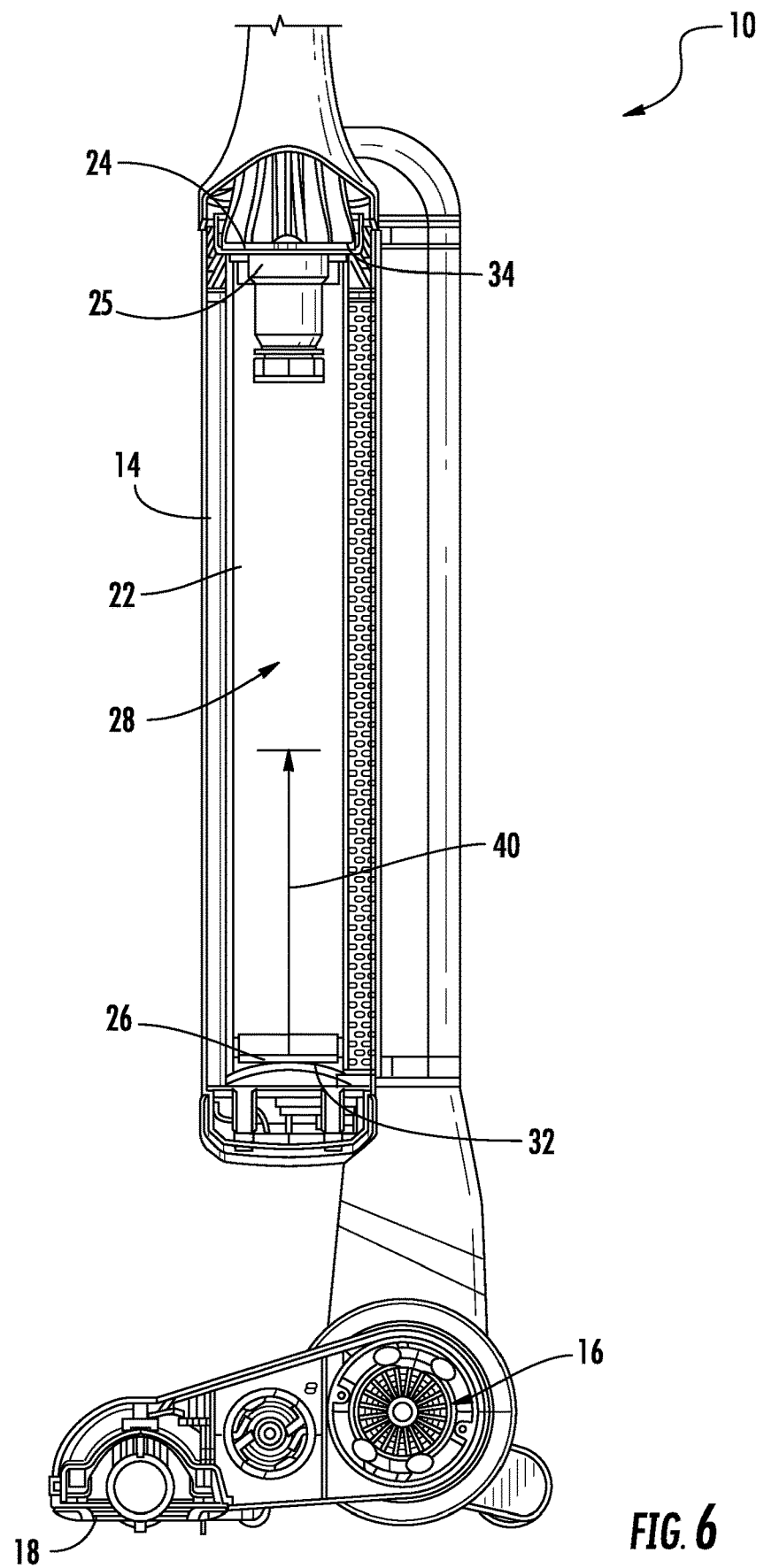
FIG. 6 is a cross-sectional view of the vacuum cleaner of FIG. 1.
Figure 7:
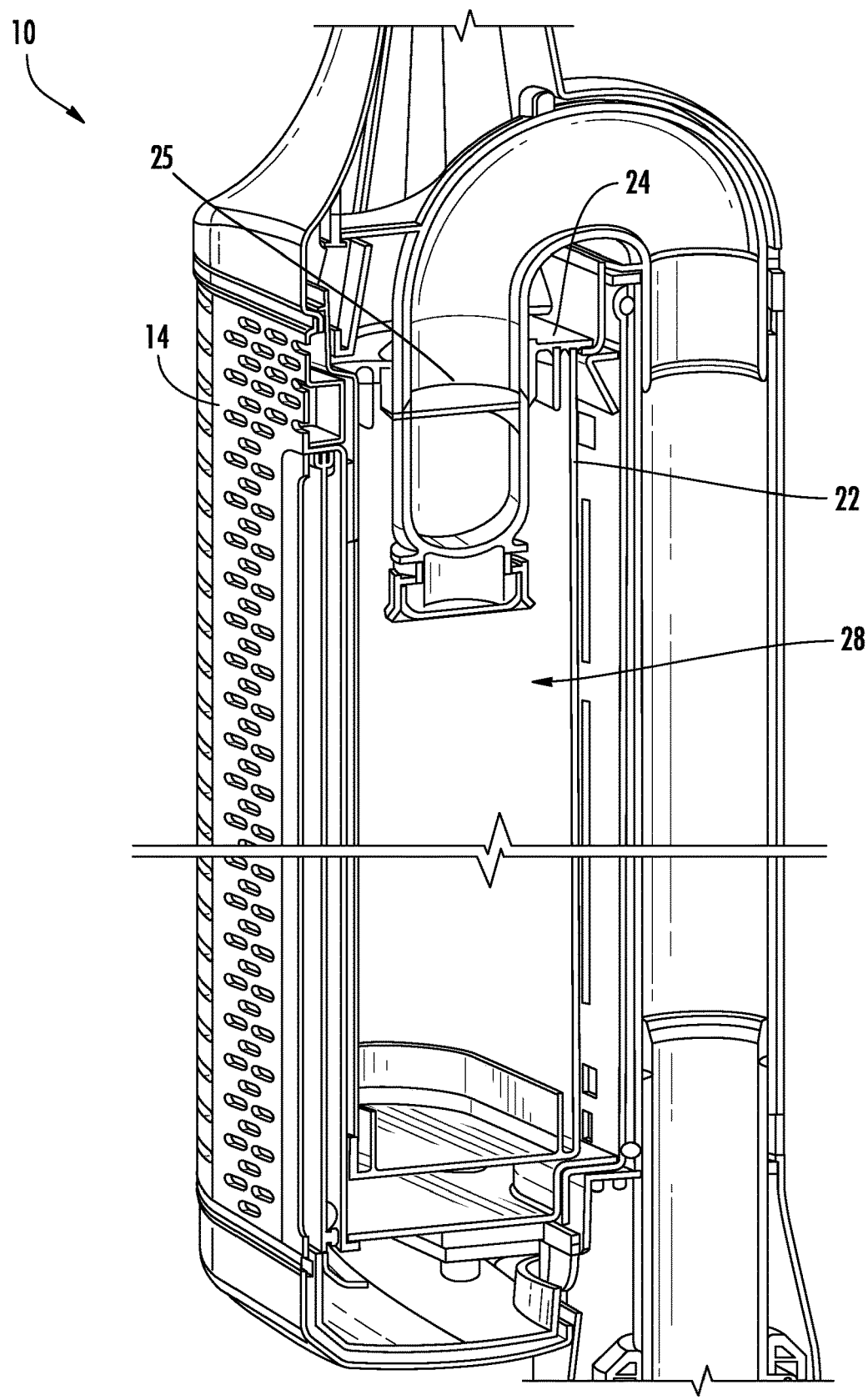
FIG. 7 is a top perspective view of the cross-section of FIG. 6.
Figure 8:
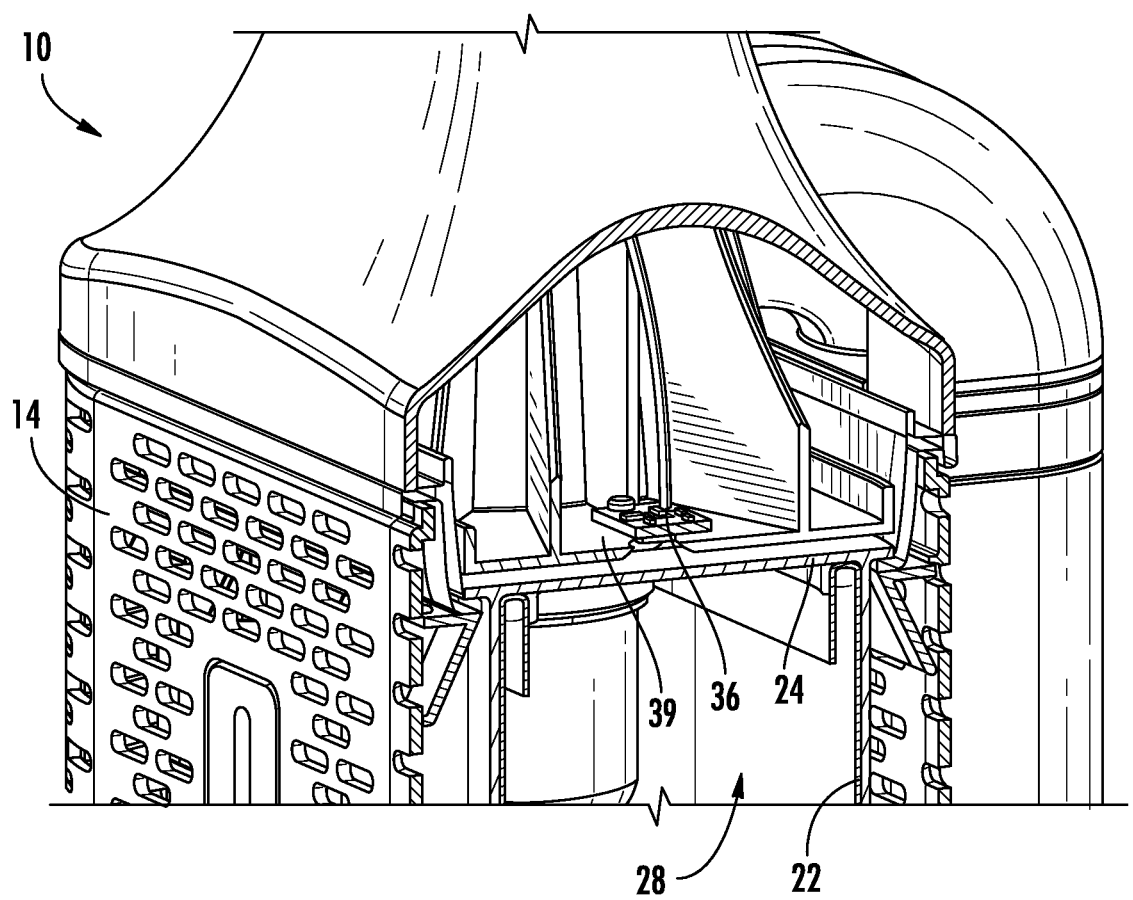
FIG. 8 is an alternative top perspective view of the cross-section of FIG. 6.

The dirt collector 14 is in fluid communication with the suction source 16 and the nozzle 18. The dirt collector 14 separates the debris from the suction airflow and stores the separated debris. Referring to FIGS. 6 and 7, in the illustrated embodiment, the dirt collector 14 includes a top or first housing or end cap 24 and an air-permeable filter media 22 extending from the housing 24 such that the filter media 22 and housing 24 at least partially define a collection volume. The housing 24 has an inlet opening 25 in fluid communication with the collection volume 24. In the illustrated embodiment, the dirt collector 14 includes a bottom or second housing or end cap 26 and the filter media 22 extends between the top housing or end cap 24 and bottom housing or end cap 26. The filter media 22 is air permeable so that the filter media 22 allows clean air to exit the filter media 22 while retaining the debris inside a storage volume 28 defined by the media 28 and the end caps 24, 26. In the illustrated embodiment, the end caps 24, 26 are generally not air permeable. Also, although the illustrated dirt collector 14 includes a filter media 22, in other embodiments, the dirt collector can include a cyclonic separator or a combination of a cyclonic separator and a filter or filters.

With continued reference to FIG. 6, the dirt collector 14 includes a top end 30 and a bottom end 32. Generally, the dirt collector 14 is filled with debris starting at the bottom end 32 and as the amount of debris stored increases, the fill level rises toward the top end 30. Thus the dirt collector fill level can be determined by measuring the fill level as it rises toward the top end 30. The dirt collector fill level can also be determined by measuring a differential pressure across the filter media 22. That is, the difference in pressure between the pressure in the storage volume 28 or in the airflow path and the atmospheric pressure outside the storage volume (or inside the storage volume 28 when the suction source 16 is not operating) can be correlated to the fill level. Or, as will be discussed in more detail below, in the illustrated embodiment, the dirt collector fill level is a function of both the differential pressure and the amount of debris in the storage volume 28.

Referring to FIGS. 4-8, the vacuum cleaner 10 further includes a first sensor 34, a second sensor 36, and a controller 38 that receives signals from the sensors 34 and 36. The first sensor 34 in the illustrated embodiment is a pressure sensor that senses the pressure inside the storage volume 28, discussed above. In the illustrated embodiment, the second sensor provides a signal indicative of a distance between the sensor and an amount of debris in the storage volume. The second sensor 36 in the illustrated embodiment includes an infra-red (IR) sensor, but optionally could utilize other wavelengths of electromagnetic radiation or may be an ultra-sonic sensor or a camera. The IR sensor 36 is located at the top end 30 of the dirt collector 14 and faces down toward the bottom end 32. In the illustrated embodiment, the IR sensor 36 includes an emitter of an infrared light and a detector. The emitter may direct the IR beam having a beam angle between about 5 and 165 degrees. In the illustrated embodiment, the beam angle is between about 15 and 60 degrees, more particularly is approximately 30 degrees. The IR sensor includes a detector to sense light reflected back from the debris and received by the detector, whereby the sensor provides a signal indicative of the distance to the debris. At least a portion of the top housing 24 of the current embodiment is transmissive of electromagnetic radiation, specifically transmissive of infrared radiation, so that the IR sensor 36 is placed outside the storage volume 28 and the IR light beam travels through the transmissive housing 24 for the sensor to sense the amount of debris within the storage volume 28. The housing may be formed of an electromagnetic radiation transmissive material, or a window 39 in the housing or a portion of the housing may be formed of an electromagnetic radiation transmissive material. In any event, the electromagnetic radiation transmissive material is selected to be transmissive of the wavelength emitted by the selected sensor and having a percent transmission selected for the sensor to provide a signal indicative of the distance to the debris. In the illustrated embodiment, the housing is formed of a material that transmits infrared radiation of a wavelength between 750 and 3000 nanometer (nm), and a percent transmission of infrared radiation of greater than or equal to 50% measured at the selected sensor wavelength. Alternatively, the material may have a percent transmission of infrared radiation of greater than or equal to 65% measured at the selected sensor wavelength. Alternatively, the material may have a percent transmission of infrared radiation of greater than or equal to 80% measured at the selected sensor wavelength.

In the illustrated embodiment, the selected sensor is an IR sensor emitting a wavelength between 800 and 1000 nanometer (nm), and in one example is 850 nanometer (nm). In the illustrated embodiment, the housing material is an IR transmissive polycarbonate having a material thickness less than 2 millimeters (mm). The transmissive housing material may have a thickness between 1 and 2 millimeters (mm). In other embodiments, the transmissive housing material may have a thickness between ½ and 2 millimeters (mm). In another alternative, the transmissive housing material may be acrylic or other infrared transmissive materials. In one embodiment, the housing 24 material includes MAKROLON 2805.

Optionally, the transmissive housing material may be transparent or translucent. In other embodiments, the second sensor 36 can include a pressure sensor, an opacity sensor, an electromagnetic radiation sensor, an ultra-sonic sensor, or a camera providing a signal indicative of an amount of debris in the dirt collector.

The controller 38 receives signals from the sensors 34, 36 and processes the signals to determine a dirt collector fill level. The controller 38 then outputs the dirt collector fill level to the visual display 12. In the illustrated embodiment, the dirt collector fill level is a function of the bottom to top fill amount 40 (FIG. 6) of debris in the storage volume 28 and the differential pressure across the filter media 22. In other embodiments, the dirt collector fill level may be based on only one of these variables or one of these variables in combination with another variable.

Figure 2:
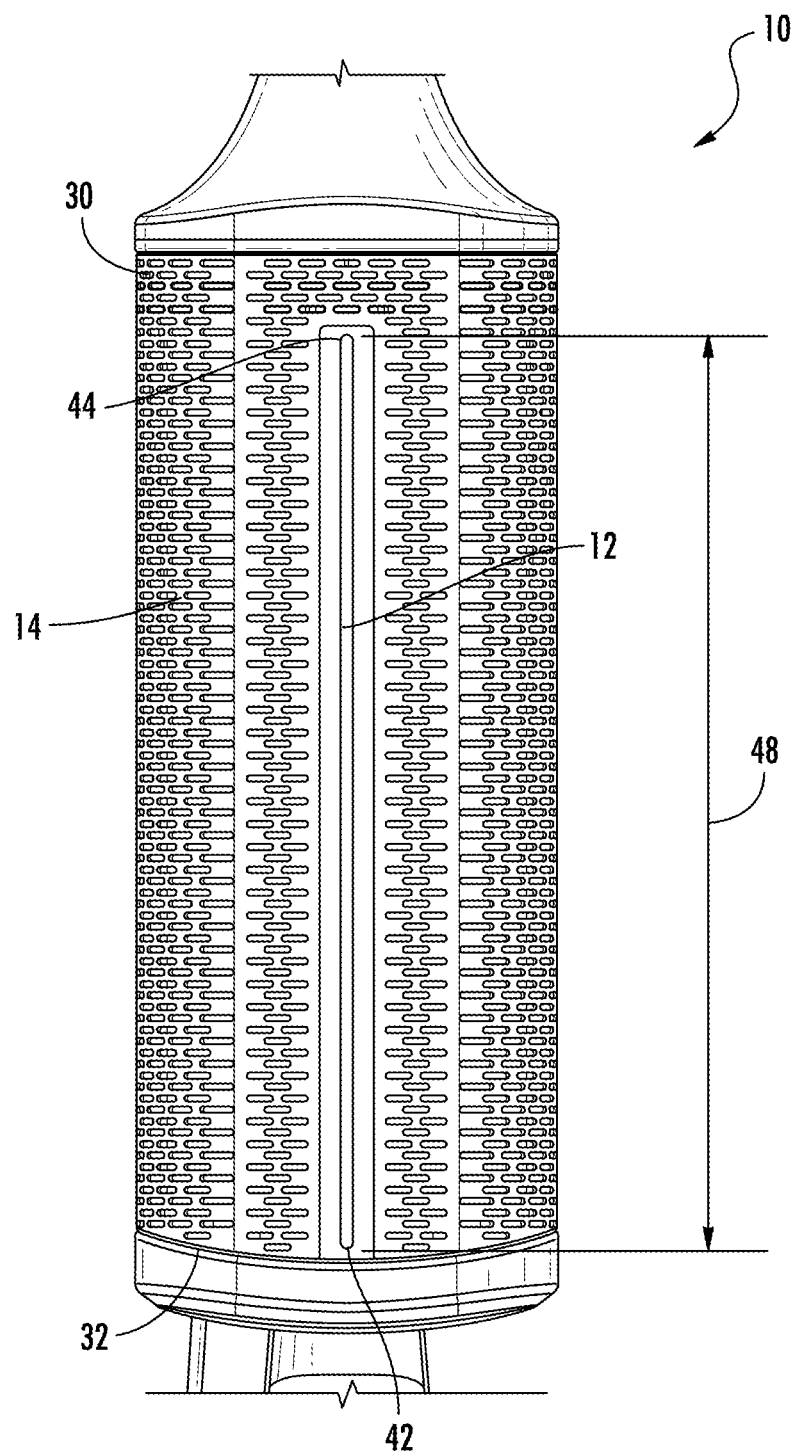
FIG. 2 is a front side view of a portion of the vacuum cleaner of FIG. 1.
Figure 3:
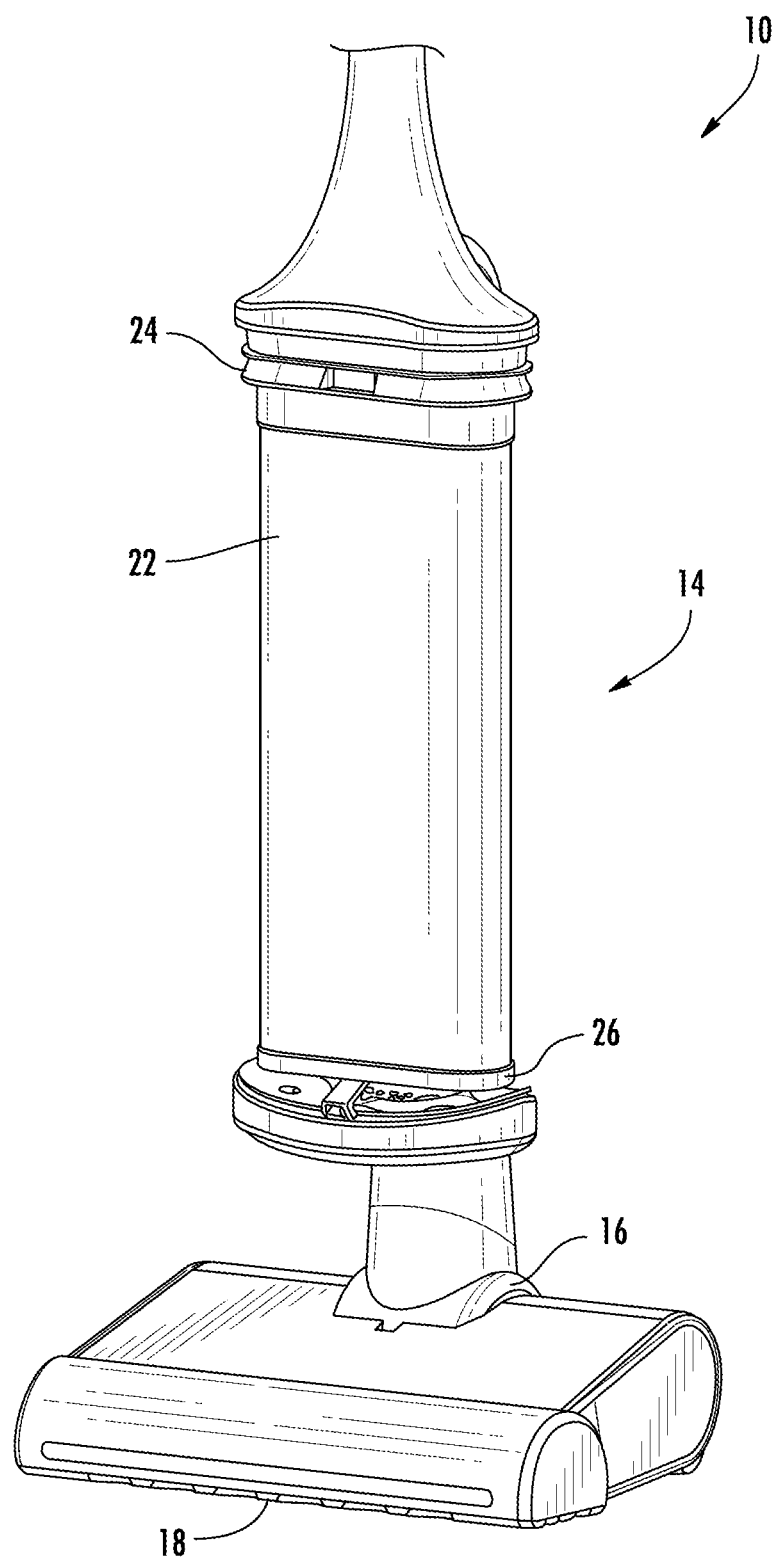
FIG. 3 is a perspective view of the vacuum cleaner of FIG. 1 with an outer housing of a dirt collector removed.
Figure 4:
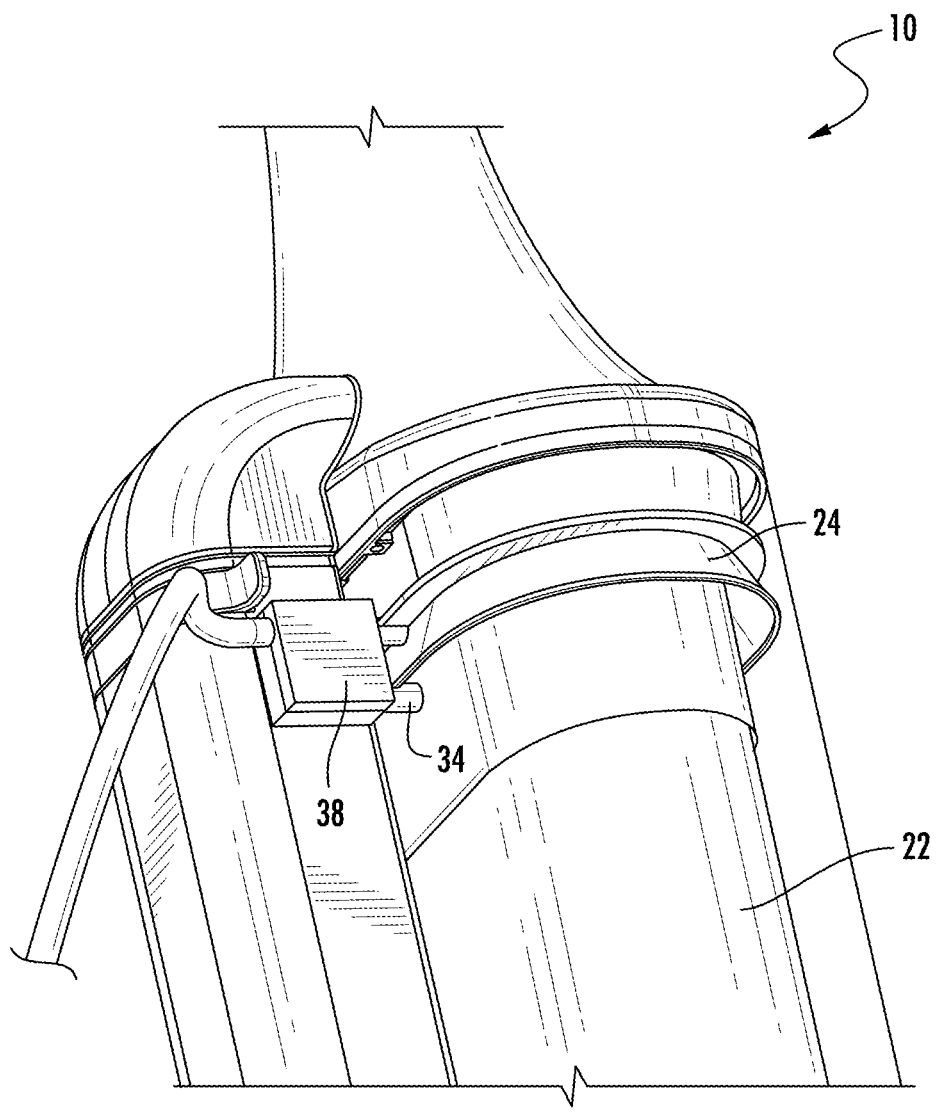
FIG. 4 is an enlarged view of a portion of the vacuum cleaner of FIG. 1 with the outer housing of the dirt collector removed.
Figure 5:
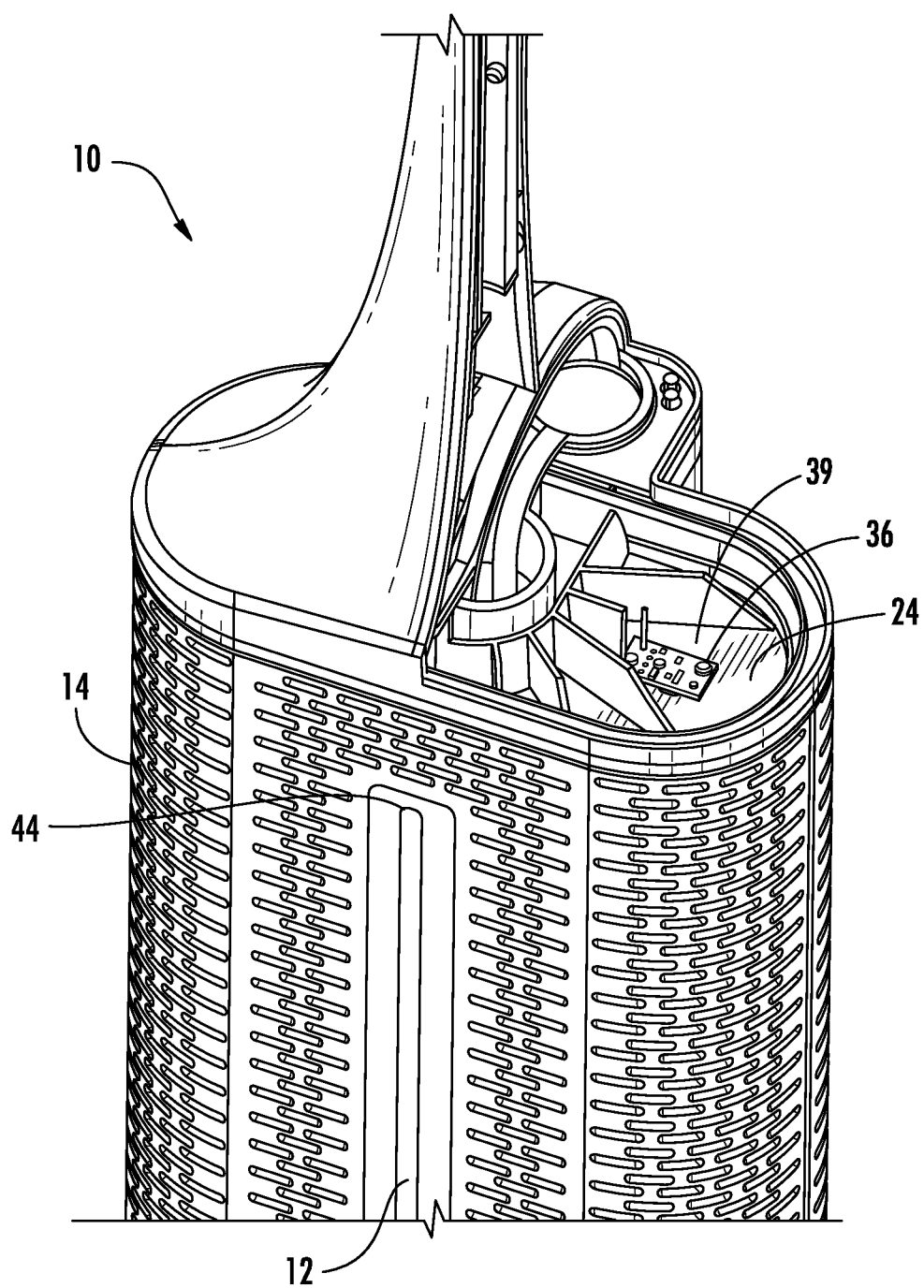
FIG. 5 is a top perspective view of the vacuum cleaner of FIG. 1 with a handle removed.

Referring to FIGS. 1 and 2, the visual display 12 displays the dirt collector fill level determined by the controller 38. The visual display 12 includes a first or lower end 42 adjacent the bottom end 32 of the dirt collector 14 and a second or upper end 44 adjacent the top end 30 of the dirt collector 14. In the illustrated embodiment, the visual display 12 includes an array of light emitting diodes (LEDs) that extends from the first end 42 to the second end 44 of the display 12. The LEDs provide an indicator that travels from the bottom end 42 to the upper end 44 as the dirt collector fill level increases to indicate to the user the fill level. In the illustrated example, the LED indicator lights up from the bottom end 42 to the upper end 44 generally corresponding to the increasing dirt collector fill level to indicate to the user the fill level.

Figure 9:
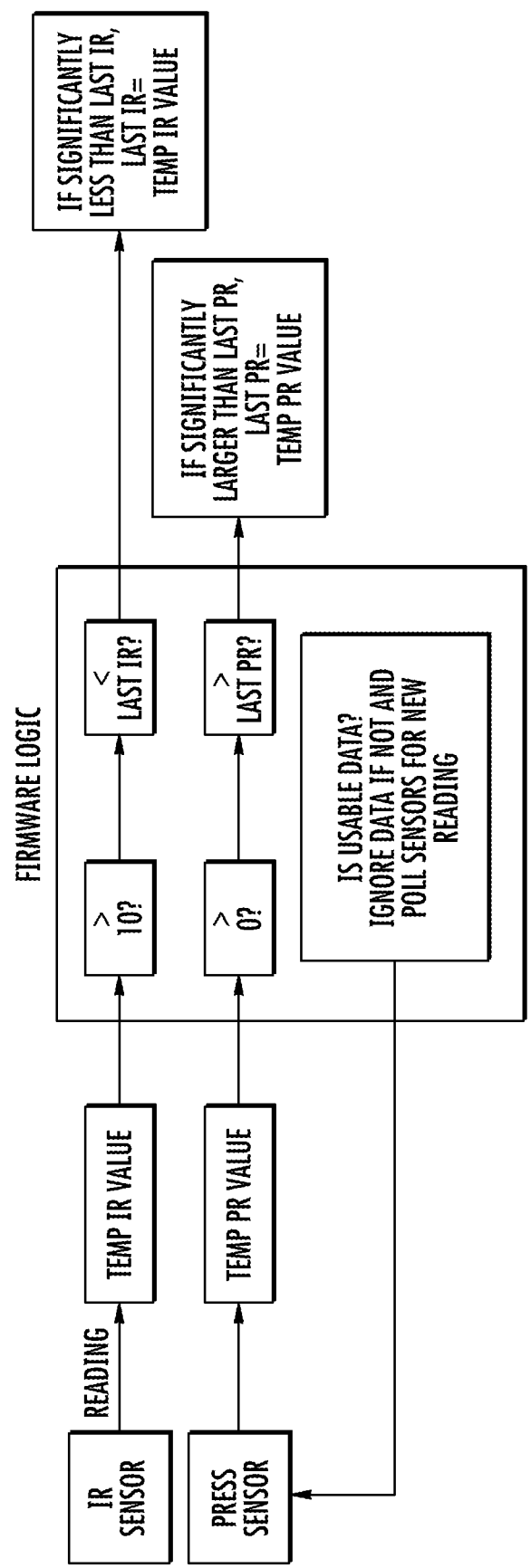
FIG. 9 is a diagram illustrating one method of operating the vacuum cleaner of FIG. 1.

FIG. 9 illustrates one possible firmware logic diagram of the controller 38 to determine the dirt collector fill level as a function of the signals from the pressure sensor 34 and the IR sensor 36. As illustrated in FIG. 9, the controller 38 uses the signals from the first sensor 34 (pressure sensor in illustrated embodiment) and the second sensor 36 (IR sensor in illustrated embodiment) to determine the dirt collector fill level. In the illustrated embodiment, the controller 38 determines a first fill level based on the first sensor 34 signal and a second fill level based on the second sensor 36 signal. The controller 38 determines the higher of the first and second fill levels to be a container fill level amount. Then, the controller outputs the container fill level amount to the visual display 12. For example, in one possible operation, if the first sensor indicates a 40 percent fill level calculated from a pressure in the dirt collector and if the second sensor indicates a 75 percent fill level calculated from a distance between the sensor and the amount of debris in the storage volume, then the controller would output a 75 percent container fill level amount to the display. Referring to FIG. 2, the visual display 12 has a length 48 measured from the bottom end 42 to the top end 44. If the controller 38 determines that the dirt collector 14 is 75 percent full, then 75 percent of the length 48 of the LEDs, starting from the bottom end 42, will be lit to indicate 75 percent full dirt collector 14 to the user.

Referring to FIG. 6, a 75 percent fill level may or may not equal 75% of the bottom to top volumetric fill amount 40 of the storage volume 28 because the percent fill level is also a function of the pressure sensed by the sensor 34. For example, the user may use the vacuum 10 to collect very fine debris that has a relatively low volume but attaches to the filter media 22 and increases the differential pressure across the filter media more rapidly than coarse or large debris. Therefore, the visual display could display 100 percent fill level when the bottom to top fill amount 40 is still relatively low. Furthermore, it should be understood that the fill level display 12 may include a scale from 0%-100% (or similar) that is a graphical representation of the fill level and not the actual distance 40 (FIG. 6).

In some embodiments, the controller 38 uses an average of outputs from the first and second sensors 34, 36 to determine the fill level. For example, the controller determines the first fill level based on the first sensor signal and the second fill level based on the second sensor signal, and then determines an average of the first and second fill levels to be the displayed fill level amount. In other embodiments, the controller uses a formula or look-up table to combine the first and second sensor outputs based on empirical or other information including sensor reliability, sensor accuracy, and system attributes of the first and second sensors and the vacuum cleaner. For one example, the fill level determined by a pressure reading may be adjusted by a function of the distance between the sensor and an amount of debris in the storage volume measured by the second sensor. In another example, the IR sensor accuracy may diminish as the dirt container fills, and the controller may adjust the IR distance measurement as a function of the pressure differential measured by the first sensor. Other system and performance attributes may be taken into account in determining the container fill level. In yet another embodiment, the controller determines the displayed fill level amount based on one of the two sensors alone until the other of the sensors reaches a threshold, after which time the displayed fill level is determined by a function of both the first sensor signal and the second sensor signal as described. For example, the displayed fill level may be based on the IR sensor signal alone until the differential pressure measured by the pressure sensor reaches a predetermined threshold, after which time the displayed fill level is determined by a function of both the pressure and IR sensor signals.

Various features and advantages of the invention are set forth in the following claims.

What is claimed is:

1. A vacuum cleaner comprising:
a sensor;
a housing; and
an air-permeable filter media extending from the housing such that the filter media and the housing at least partially define a collection volume;
the housing having an inlet opening in fluid communication with the collection volume and the housing including a window that is transmissive of infrared radiation, and wherein the sensor is outside of the housing and the sensor senses an amount of debris within the collection volume through the window.

2. The vacuum cleaner according to claim 1, where the window of the housing that is transmissive of infrared radiation is transmissive of infrared radiation of a wavelength between 750 and 3000 nanometer (nm).

3. The vacuum cleaner according to claim 2, where the window of the housing that is transmissive of infrared radiation has a percent transmission of infrared radiation of greater than or equal to 50%.

4. The vacuum cleaner according to claim 2, where the window of the housing that is transmissive of infrared radiation is transmissive of infrared radiation of a wavelength between 800 and 1000 nanometer (nm).

5. The vacuum cleaner according to claim 1, where the housing is formed of polycarbonate material.

6. The vacuum cleaner according to claim 1, where the window of the housing that is transmissive of infrared radiation has a thickness in a range from 1 to 2 millimeters.

7. The vacuum cleaner according to claim 1, further comprising a second housing, wherein the housing, the second housing, and the filter media define the collection volume.

8. The vacuum cleaner according to claim 7, where the second housing is transmissive of infrared radiation of a wavelength between 750 and 3000 nanometer (nm).

9. A vacuum cleaner comprising:
a sensor:
a housing; and
an air-permeable filter media extending from the housing such that the filter media and the housing at least partially define a collection volume;
the housing having an inlet opening in fluid communication with the collection volume;
wherein at least a portion of the housing is translucent or transparent,
wherein the sensor is outside of the housing and the sensor senses an amount of debris within the collection volume through the portion of the housing that is translucent or transparent.

10. The vacuum cleaner according to claim 9, where at least a portion of the translucent or transparent housing is transmissive of infrared radiation.

11. The vacuum cleaner according to claim 10, where the portion of the housing that is transmissive of infrared radiation is transmissive of infrared radiation of a wavelength between 750 and 3000 nanometer (nm).

12. The vacuum cleaner according to claim 11, where the portion of the housing that is transmissive of infrared radiation has a percent transmission of infrared radiation of greater than or equal to 50%.

13. The vacuum cleaner according to claim 11, where the portion of the housing that is transmissive of infrared radiation is transmissive of infrared radiation of a wavelength between 800 and 1000 nanometer (nm).

14. The vacuum cleaner according to claim 9, where the housing is formed of polycarbonate material.

15. The vacuum cleaner according to claim 9, further comprising a second housing, wherein the housing, the second housing, and the filter media define the collection volume.

16. The vacuum cleaner according to claim 15, where the second housing is transmissive of infrared radiation of a wavelength between 750 and 3000 nanometer (nm).

17. A vacuum cleaner comprising:
a sensor;
a top housing;
a bottom housing;
a filter media extending between the top housing and the bottom housing such that the filter media, the top housing, and the bottom housing fully define a collection volume; and
an inlet opening in fluid communication with the volume;
wherein the top housing includes a window that is transmissive of infrared radiation,
wherein the sensor is outside of the collection volume and the sensor senses an amount of debris within the collection volume through the window.

18. The vacuum cleaner of claim 17, wherein the filter media includes an elliptical filter.

19. The vacuum cleaner of claim 17, wherein at least a of the portion window of the top housing that is transmissive of infrared radiation is translucent or transparent.

* * * * *